(12) United States Patent
Skultety-Betz

(10) Patent No.: US 6,588,868 B1
(45) Date of Patent: Jul. 8, 2003

(54) MARKING APPARATUS

(75) Inventor: Uwe Skultety-Betz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/488,450

(22) Filed: Jan. 20, 2000

(30) Foreign Application Priority Data

Jan. 20, 1999 (DE) ......................................... 199 02 075

(51) Int. Cl.$^7$ ............................................... G01C 15/06
(52) U.S. Cl. .............................. 347/2; 33/293; 33/296; 33/666
(58) Field of Search ................................ 33/1 CC, 293, 33/294, 295, 296, 367, 574, 666; 347/2, 109, 37; 346/143; 400/193

(56) References Cited

U.S. PATENT DOCUMENTS

| 4,448,528 A | 5/1984 | McManus | .................... 356/250 |
| 5,620,191 A | * 4/1997 | Sayette | ........................... 280/8 |
| 5,829,147 A | * 11/1998 | Kousek et al. | ................. 33/293 |

FOREIGN PATENT DOCUMENTS

| DE | 40 13 8950 A | 11/1991 |
| DE | 196 34 800 A | 3/1998 |

OTHER PUBLICATIONS

Patent Abstracts of Japan vol. 1995, No. 09, Oct. 31, 1995 & JP 07 146146A, Jun. 6, 1995.

* cited by examiner

*Primary Examiner*—Judy Nguyen
*Assistant Examiner*—Julian D. Huffman
(74) *Attorney, Agent, or Firm*—Michael J. Striker

(57) ABSTRACT

The marking apparatus for marking a surface (9), especially to guide work performed on a ceiling or a wall of a building, includes a marking unit having a device for making a mark on the surface, such as a writing instrument or stylus combined with a light-sensitive device (4) for detecting a light beam (6), which can be a linear array of photo sensitive elements (16), and a frame (1) on which the marking device and the light-sensitive device are mounted; and a control circuit arranged in a housing (5) of the marking unit for operation of the writing tool to make a localized mark on the surface according to a signal from the light-sensitive device (4) when the light-sensitive device (4) detects the light beam (6). In a preferred embodiment the writing tool is mounted on a traveling carriage (10) that moves to the position at which the light-sensitive,element receiving the light beam is received and makes the mark at that position

19 Claims, 3 Drawing Sheets

MARKING APPARATUS

BACKGROUND OF THE INVENTION

1. Field of the Invention

The present invention relates to a marking apparatus for marking a surface, especially for making a position mark on a wall or ceiling of a building to be worked on.

2. Prior Art

Numerous devices and methods for projecting a light marking, especially with the help of lasers, are known. A device is described in U.S. Pat. No. 4,448,528, with whose aid a measured position on a floor of a room can be projected exactly vertically to a ceiling above it. However a mark projected, in this manner is not immediately usable as a reference for working the concerned surface, because it is generally not possible to position a work tool according to the projected mark, without covering the projecting beam at the same time. A pen must therefore by used to apply a permanent ink mark at the position of the projected mark, or a tip of a small object, such as a nail, must be held on the projected mark and struck with a hammer in order to make a mark in the form of a small hole.

This procedure however frequently produces inaccurate results, since a person who makes the permanent mark can only observe the pen or tip of the object that is used to make the mark at an angle to the projected beam, so as not to cover it, so that parallax errors can easily occur. Moreover the places to be marked, especially on a high ceiling of a, room, are reached only with difficulty, which understandably increases the cost of the work performed.

SUMMARY OF THE INVENTION

According to the invention means for making a mark on a surface, including a writing instrument such as a stylus, are combined with a light-sensitive device to form a common marking unit. The marking apparatus also includes a control means, which puts the light-sensitive device and the means for making the mark on the surface in an operational relationship, whereby the means for making the mark is operated to make the mark when the light-sensitive device detects a light signal. The marking apparatus according to the invention need only be held against the surface to be marked and it will automatically make a mark on that surface when it meets the projected beam, in contrast to the additional effort required to make the mark with the aid of a pen or with a hammer and nail.

The writing instrument is preferably provided with a nozzle, which is controlled by the control device to deliver ink powder or paint, so that the mark is applied to the surface.

The light-sensitive device is preferably a position-resolving arrangement of individual light sensors, especially a linear arrangement of light sensors, such as photo diodes, and the control device is equipped to control the means for making the mark so that it places the mark at a position on the surface, which corresponds to a position at which the light-sensitive device detects the projected light beam. An extended arrangement of light sensors of this sort is obviously easier to position in a projected light beam than an individual light sensor. The control by the control circuit occurs according to the geometric properties of the marking unit, so that the mark is placed at a position on the surface at which -the projected light beam would impinge or meet the surface if the marking unit itself were not on the surface.

Especially when the means for making the mark includes an individual writing tool or stylus the control circuit is preferably equipped in order to move the stylus according to a position where the light-sensitive device detects the light signal, so that the stylus can put the mark at the position on the surface indicated with the projected beam.

Preferably the means for making the mark and the light-sensitive device are mounted on opposite sides of a frame of the marking unit. This frame can be placed before the surface to be marked so that the means for making the mark is on the side of the frame facing or closest to the surface and the light-sensitive device is mounted on the opposite side of the frame facing or closest to the source of the projected light beam.

In many applications, especially on transferring a mark from the floor to the ceiling of a room or on projecting a horizontal line on the wall of a room, the projected beam is substantially perpendicular to the surface to be marked. Under these conditions a parallax-free application of the mark is possible, when the control device controls the means for making the mark, so that the position where it places the mark and the position at which the light-sensitive device detects the light signal are arranged on a vertical line, which extends from the side of the frame on which the means for making the mark is mounted to the position on the surface to be marked.

In order to simplify the transfer to a continuous mark such as a line onto a surface, the frame of the marking tool is provided with wheels for moving.its housing over the surface to be marked. Preferably the frame has three wheels in order to guarantee a definite stable position of the marking tool on the surface even when the surface is rough.

According to a preferred embodiment of the invention at least one of these wheels can be steered or controlled, for example by a person who operates the marking tool or by the control circuit according to the location where the light-sensitive device detects the light signal, in.order to be able to rapidly and conveniently move it along a line extending on the surface and defined by the projected light beam, without the light-sensitive.device wandering away from the projected beam.

For use in inaccessible locations the marking apparatus is preferably also equipped with a stud or projection for a pole, with whose help, for example, an operator on the floor of a room can press the tool against the ceiling.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
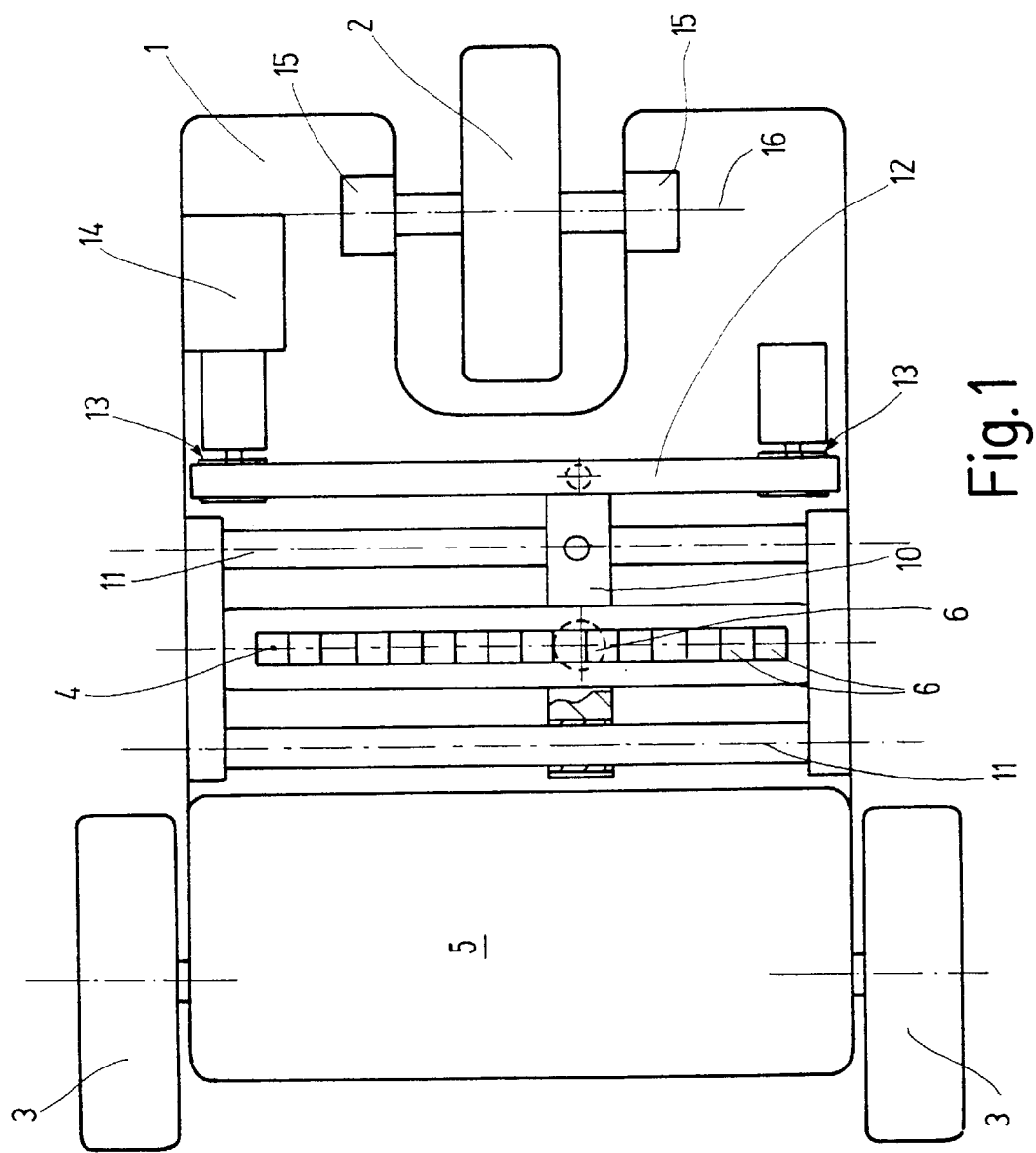
FIG. 1 is a top plan view of marking apparatus according to the invention.
Figure 2:
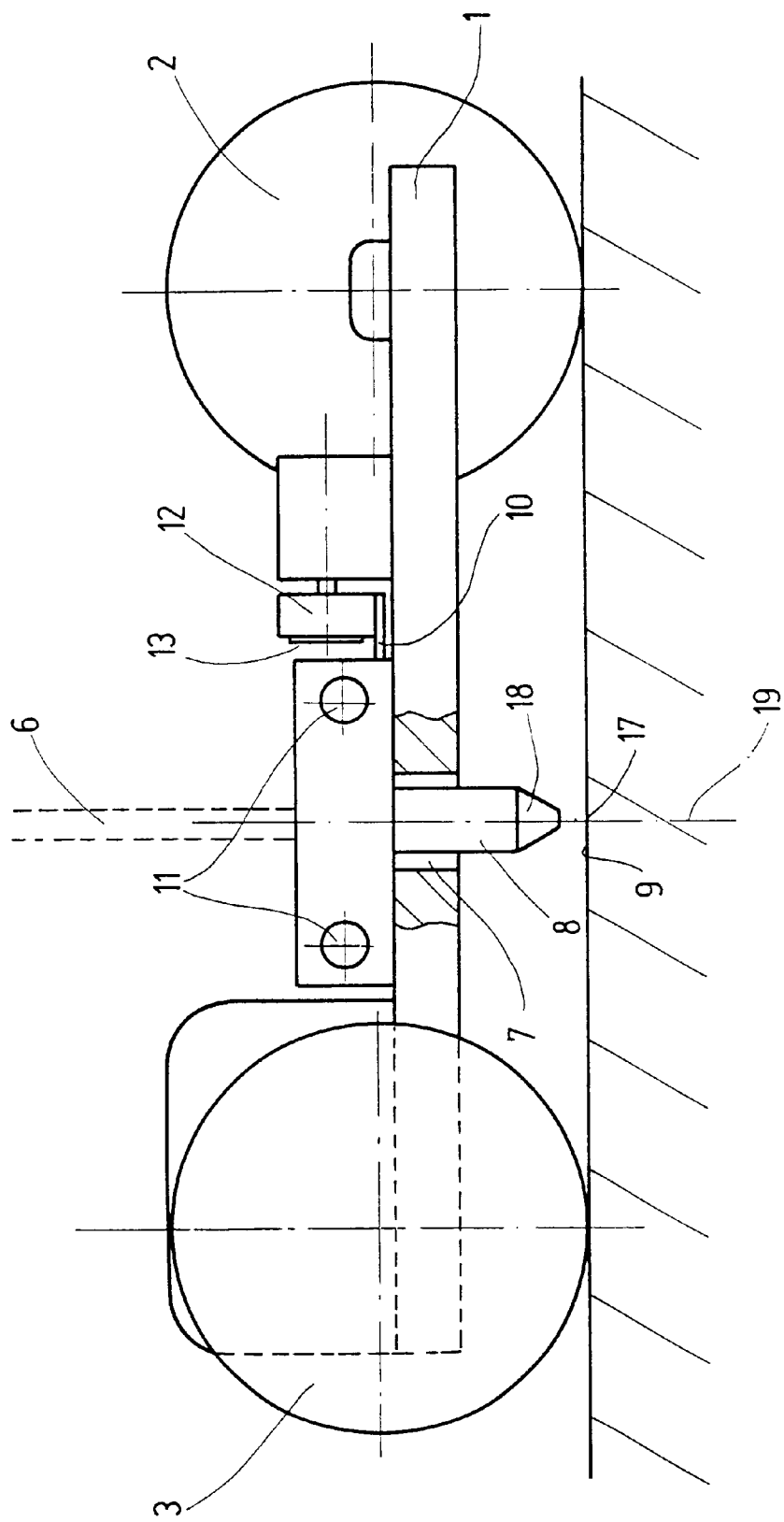
FIG. 2 is a side elevational view of the apparatus shown in FIG. 1.

One embodiment of a marking unit or tool according to the invention is shown in FIGS. 1 and 2. It comprises a base plate or frame 1 of substantially rectangular shape, with a first wheel 2 arranged on a smaller end of the rectangular base plate or frame 1 and two second wheels 3, also indicated as rear wheels, in the vicinity of the larger end opposite to the smaller end. The tool can travel on any arbitrary surface 9 to be marked with the help of these three wheels 2, 3. A light-sensitive device 4 in the form of a photo diode linear array extends substantially over the entire width of the frame 1 and is connected with a control circuit, which can be accommodated in a housing 5. The control circuit detects signals representative of the received light intensity from each of the individual photo diodes 16 and thus is in a position to detect on which of the photo diodes the light beam impinges, which is indicated in FIG. 1 as a dashed circle. This light beam, preferably a laser beam, is directed to a point on a surface, which should be provided with a localized ink mark, e.g. a dot, by the marking apparatus.

As seen from FIG. 2, a slot 7 extends through the frame 1 under the light-sensitive device 4 over its entire length. A writing tool or stylus 8 extends through the slot 7 until near the surface 9 to be marked. The stylus 8 includes a nozzle 18, which is operated by the control circuit in housing 5, to deliver a paint or a powdery ink mark.

The stylus 8 is mounted on a carriage 10, which is guided along the slot 7 on two rails 11, which means slidably mounted transversely to the motion direction of the marking apparatus on the surface 9.

The carriage 10 is attached to an endless drive belt 12, which is guided around two rollers 13 on opposite sides of the frame 1. One of the rollers 13 is drivable by a motor 14.

When the control circuit has detected the position, at which the light beam 6 impinges on the photodiode linear array (light-sensitive device 4), it controls the motor 14 in order to move the carriage 10 into a position, in which the stylus is exactly under the impingement point of the light beam 6 on the diode linear array, in observation vertically from above as in FIG. 1. In other words, the stylus 8 and the position on which the beam 6 falls on the light-sensitive device 4 are arranged on a line 19, which is perpendicular to the surface 9 or the underside of the marking unit facing this surface 9. As soon as this position is reached, the stylus 8 is controlled to spray ink on the surface 9 at a position 17 at which the line 19 intersects the surface 9.

Figure 3:
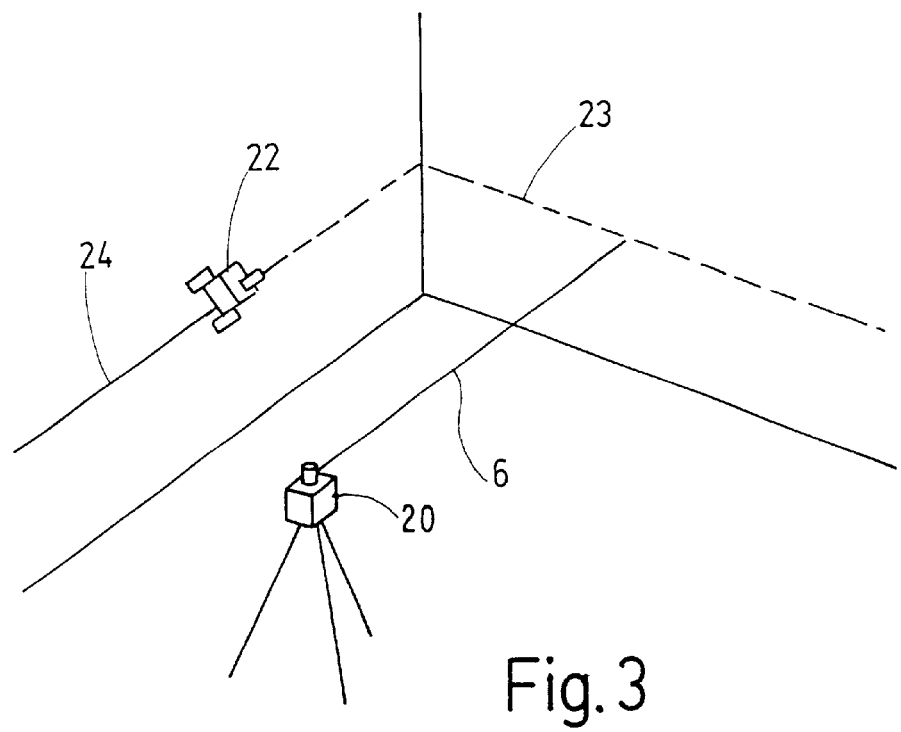
FIG. 3 is a perspective diagrammatic view illustrating one typical application of the marking apparatus according to the invention.

FIG. 3 shows a first typical application of the marking apparatus according to the invention. A leveling laser 20 issues a rotating laser beam 6 with the help of a rotating mirror, which is propagated horizontally and strikes the walls of the room. An unshown (in FIG. 3) operator guides the marking apparatus 22 according to the invention along the light path 23 formed on the wall by the laser beam 6. The marking apparatus 22 places an ink mark on the wall each time one of its light-sensitive elements or diodes is struck by the rotating laser beam 6. In this way a sequence of localized marks, e.g. points or dashes, or a solid line, which is indicated in FIG. 3 as a solid line 24 is made on the wall. Since the laser beam 21 extends exactly horizontally, even when the marking apparatus, as observed from above, is not exactly perpendicular to the laser beam, the mark is made at the correct height.

Figure 4:
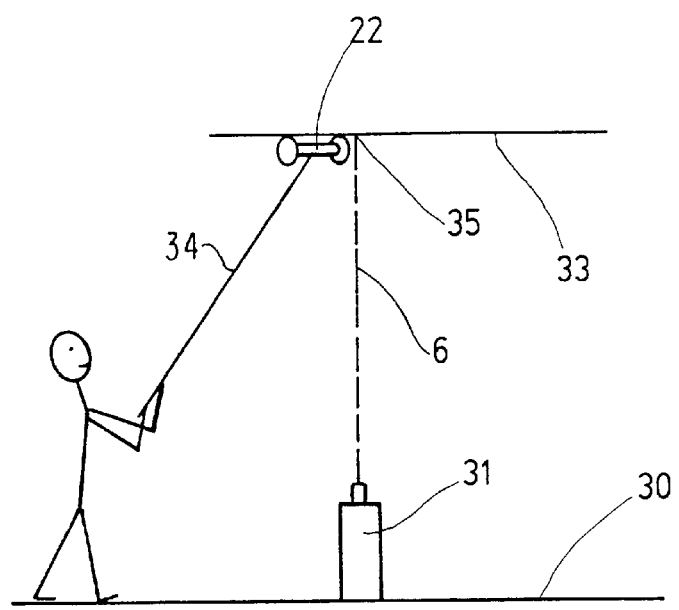
FIG. 4 is another diagrammatic view illustrating another typical application of the marking apparatus according to the invention.

FIG. 4 shows a second typical application of the marking apparatus. When a reference point is measured on a floor 30 of a room, a laser 31 is placed over this point, which delivers an exactly vertically aligned beam 6, in order to transfer the reference point to the ceiling 33 of the room. An operator presses the marking unit 22 against the ceiling 33 with the help of a pole 34, which is attached to an extension or projection of the frame 1 (not shown in FIGS. 1 or 2). The pole 34 is appropriately extensible telescopically, in order to guarantee easy manipulation of the marking apparatus, also for rooms having ceilings of differing height.

Since it can be difficult to maneuver the marking apparatus 22 on the ceiling to the point of impingement 35 with the laser beam 6 with the help of the long pole 34, it is appropriate in this application when the front wheel 2 is controllable by the operator, for example with the help of a tow rope or line guided through the pole 34.

In case an extended long line similar to the line 24 as in FIG. 3 is to be provided on the ceiling, means for controlling the front wheel 2 by the control circuit can be provided, for example in the form of small adjusting cylinders, which are in a position to shift the bearings 15 of the front wheel 2 (see FIG. 1) mounted in the frame 1, in order to rotate the axle 16 of the front wheel. In this way the control circuit can make adjustments, when it detects that the light beam 6 wanders off in the edge region of the light-sensitive device, that the marking apparatus leaves the area on which the light beam impinges.

Numerous embodiments of the invention are possible. For example, the drive belt 12 can be replaced by a screw extending transversely beyond the frame 1, which is rotatably driven in order to shift the carriage riding on the screw.

However the invention is not limited to the use of a single stylus to be shifted. It is also possible to mount a plurality of writing tools or styluses locally fixed under the light-sensitive device 4, whereby for example each individual photo diode of the light-sensitive device can be associated with a stylus. According to which photo diode registers the presence of the laser beam 6, then the stylus associated with this photo diode can make the mark. Thus the elimination of the required travel of the stylus permits an increase in the reaction time of the marking apparatus.

The disclosure in German Patent Application 199 02 075.2 of Jan. 20, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a marking apparatus, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A marking apparatus for marking a surface (9), said marking apparatus comprising a marking unit including means for making a mark on said surface combined with and cooperating with a light-sensitive device (4), said light-sensitive device (4) comprising means for detecting a light beam (6); and control means for operation of said means for making said mark on said surface to make said mark at a predetermined position on said surface when said light-sensitive device (4) detects said light beam (6);

wherein said light-sensitive device (4) comprises a position-distinguishing arrangement of individual light sensor elements (16) and said control means includes means for moving said means for making said mark relative to said light-sensitive device (4), so that said mark is made at said predetermined position, which corresponds to a location of one of said light sensor elements (16) on which said light beam (6) impinges.

2. The marking apparatus as defined in claim 1, wherein said means for making said mark comprises at least one writing tool or stylus (8).

3. The marking apparatus as defined in claim 2, wherein said at least one writing tool or stylus includes a nozzle (18) for dispensing an ink powder or paint.

4. A marking apparatus for marking a surface (9), said marking apparatus comprising a marking unit including means for making a mark on said surface combined with and cooperating with a light-sensitive device (4), said light-sensitive device (4) comprising means for detecting a light beam (6); and control means for operation of said means for making said mark on said surface to make said mark at a predetermined position on said surface when said light-sensitive device (4) detects said light beam (6);

wherein said light-sensitive device (4) comprises a linear array of individual light sensor elements (16) and said control means includes means for moving said means for making said mark relative to said light-sensitive device (4) so that said mark is made at said predetermined position (17), which corresponds to a location of one of said light sensor elements (16) on which said light beam (6) impinges.

5. The marking apparatus as defined in claim 4, wherein said means for making said mark comprises at least one writing tool or stylus (8).

6. The marking apparatus as defined in claim 5, wherein said at least one writing tool or stylus includes a nozzle (18) for dispensing an ink powder or paint.

7. The marking apparatus as defined in claim 1, wherein said marking unit includes a frame (1) and said means for making said mark and said light-sensitive device (4) are mounted on respective opposite sides of said frame (1).

8. The marking apparatus as defined in claim 7, wherein said frame (1) is provided with wheels (2, 3) for motion over said surface (9) to be marked.

9. The marking apparatus as defined in claim 8, wherein only three of said wheels are provided for said frame (1).

10. The marking apparatus as defined in claim 8, wherein one of said wheels is steerable.

11. The marking apparatus as defined in claim 7, wherein said frame (1) has an extension or projection for engagement with a pole (34).

12. The marking apparatus as defined in claim 11, further comprising said pole (34) and wherein said pole (34) is formed for engagement with said extension or projection to guide said frame (1) on a wall or ceiling of a building.

13. The marking apparatus as defined in claim 1 or 4, wherein said marking unit includes a frame (1) and said means for making said mark and said light-sensitive device (4) are mounted on respective opposite sides of said frame (1) and wherein said predetermined position (17) at which said mark is made and said location of said light sensor element corresponding to said predetermined position lie on a vertical line (19) extending from a side of said frame on which said means for making said mark is mounted.

14. The marking apparatus as defined in calm 1, wherein said marking unit includes a frame (1) and said means for making said mark and said light-sensitive device (4) are mounted on respective opposite sides of said frame (1).

15. The marking apparatus as defined in claim 14, wherein said frame (1) is provided with wheels (2, 3) for motion over said surface (9) to be marked.

16. The marking apparatus as defined in claim 15, wherein only three of said wheels are provided for said frame (1).

17. The marking apparatus as defined in claim 15, wherein one of said wheels is steerable.

18. The marking apparatus as defined in claim 14, wherein said frame (1) has an extension or projection for engagement with a pole (34).

19. The marking apparatus as defined in claim 18, further comprising said pole (34) and wherein said pole (34) is formed for engagement with said extension or projection to guide said frame (1) on a wall or ceiling of a building.

* * * * *